(Model.)
J. R. GRAVER.
JUG.
No. 298,371. Patented May 13, 1884.
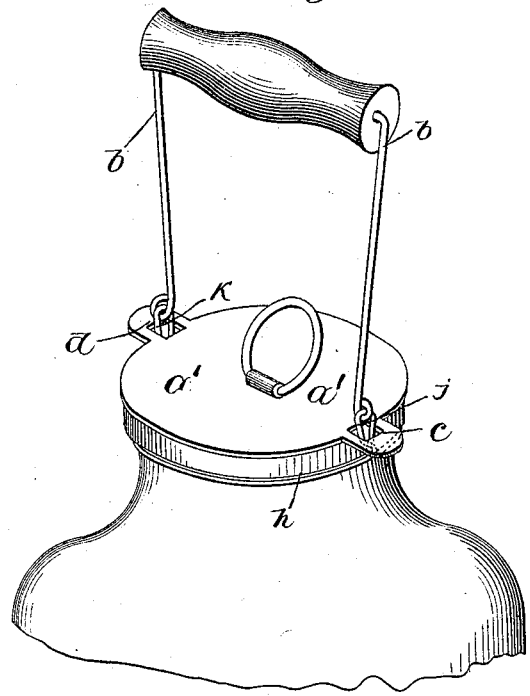
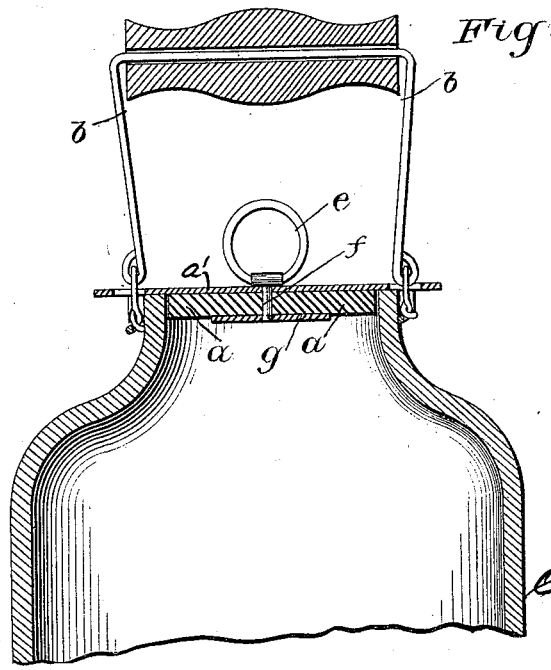
Witnesses:
Inventor:

UNITED STATES PATENT OFFICE.

JAY R. GRAVER, OF LINCOLN, NEBRASKA.

JUG.

SPECIFICATION forming part of Letters Patent No. 298,371, dated May 13, 1884.

Application filed September 12, 1883. (Model.)

*To all whom it may concern:*

Be it known that I, JAY R. GRAVER, of Lincoln, in the county of Lancaster and State of Nebraska, have invented a new and useful improvement in earthen jugs or jars, and a cork or stopper for the same with bail attached, of which the following is a specification.

The object of my invention is to provide a jug or jar with a wide mouth, and a cork with a bail attached, the cork completely filling the aperture, and at the same time securing an article of great use.

Figure 1 is a perspective view, and Fig. 2 a vertical section of a jug or jar having my improvements.

A cork, $a\ a$, fits the aperture closely, and is covered with a metal cover, $a'$. This cover extends beyond the cork, and out even with the edge of the jug or jar. In the cover are two slots, $c\ d$. Through these slots pass the two ends of the bail $b\ b$, thus securing the cork so that it cannot be separated from the jug or jar. To this cover is attached a ring, $e$, for convenience. The top $a'\ a'$ and the under part of the cover $g$, both of which are metal, are secured to each other by a rivet, $f$, passing through the center of the cork. The bail $b\ b$ is secured to the jug or jar by means of a wire, $h$, passing around the neck of the jug or jar, out of which same wire the ears $j\ k$ are formed. When the cork and cover are securely fastened into the mouth of the jug or jar, the ears $j\ k$ pass up through the slots $c\ d$. The cover, with the cork, is removed by simply drawing it outward when the ends of the bail pass through the slots.

What I claim is—

1. A cork secured with metal coverings closely fitting the mouth of the jug or jar, and secured to the jug by a bail and ears fastening through slots in the cover, as and for the purposes set forth.

2. A bail fastened to a wire with ears attached, the wire passing around the neck of the jug or jar, and the ears extending up through the slots in the cover, as and for the purposes set forth.

JAY R. GRAVER.

Witnesses:
W. Q. BELL,
T. F. HARDENBERGH.